Patented May 7, 1935

2,000,133

UNITED STATES PATENT OFFICE 2,000,133

AZO DYESTUFF

Josef Haller, Leverkusen-Wiesdorf, Germany, assignor, by mesne assignments, to Durand & Huguenin A.-G., Basel, Switzerland, a corporation of Switzerland No Drawing. Application August 4, 1931, Serial No. 555,136. In Germany August 11, 1930

8 Claims. (Cl. 260—86)

The present invention relates to a process of preparing azo dyestuffs.

Acid leuco sulfuric acid esters of vat dyestuffs find increasing application in the form of their readily soluble alkali salts in dyeing and printing. They possess the valuable property of being able to split off the sulfuric acid residues, which confer solubility, by a simple subsequent treatment of the dyeings by means of an oxidizing agent in the presence of acids and to reform the insoluble vat dyestuffs. As an oxidizing agent nitrous acid among others has proved to be particularly suitable.

In accordance with the present invention azo dyestuffs which may be represented by the following general formula:—

$$R-N=N-R_1$$

wherein R stands for the radical of an acid leuco sulfuric acid ester of an indigoid vat dyestuff, the azo group being attached to a carbon atom of an aromatic nucleus of said indigoid dyestuff and $R_1$ stands for the radical of any coupling component capable of producing azo dyestuffs, are prepared by diazotizing a leuco sulfuric acid ester of an indigoid dyestuff containing at least one diazotizable, that is an aromatic amino group and coupling with a coupling component suitable for producing azo dyestuffs. On treating the azo dyestuff formed with an oxidizing agent in the presence of a mineral acid the sulfuric acid ester groups are split off.

As leuco sulfuric acid esters of indigoid dyestuffs containing diazotizable amino groups there may be mentioned by way of example the leuco sulfuric acid esters of indol naphthalene-, indol anthracene- and idol thionaphthene indigos containing in the Bz-nucleus of the indol or of the thionaphthenene at least one free amino group.

The diazotization is carried out in the usual manner by the action of nitrous acid in the presence of acids and it is to be noted that thereby a decomposing of the leuco sulfuric acid ester group generally does not occur. In those cases where the diazotization in mineral acid solution simultaneously causes a partial decomposition of the leuco sulfuric acid ester this undesirable reaction can be avoided by employing during the diazotization weaker acids, such as for example, certain organic acids, especially lower fatty acids, such as formic acid or acetic acid. As coupling components there come into consideration for the purpose of my invention all the compounds generally used in the manufacture of azo dyestuffs, for example, acetoacetic acid arylamides, pyrazolones, β-naphthol, 2.3-hydroxy naphthoic acid arylamides, 2-hydroxy-carbazole-3-carboxylic acid arylamides and the like.

The dyestuffs obtained according to my invention are before the splitting off of the leuco sulfuric acid ester groups various colored substances generally readily soluble in water, and may be converted into the difficulty soluble or insoluble state by a subsequent treatment with oxidizing agents in the presence of mineral acids. Thus, for example, when diazotizing leuco sulfuric acid esters of indol naphthalene-, indol anthracene- or indol thionaphthene-indigoes with yellow coupling components, yellow azodyestuffs are generally obtained, which turn to green when decomposing the sulfonic acid groups by oxidation, due to the blue indigo complex contained in the molecule.

Even in the case when the azo component employed for coupling does not contain sulfonic acid or carboxylic acid groups the leuco ester of the azo dyestuff is still readily soluble in water in the form of its alkali salt. When dyeing fibres with these dyestuffs and then decomposing the sulfonic acid esters the resulting dyestuffs yield dyeings specially fast to washing.

The leuco esters of the indigoid vat dyestuffs containing diazotizable amino groups employed in the manufacture of the diazo compounds can, for example, be obtained from the corresponding indigoid vat dyestuffs containing amino groups, in which case the amino groups are acylated before esterification and finally the acyl residue is again split off by the action of alkali. The said dyestuffs can be obtained by another method through the corresponding indigoid vat dyestuffs containing nitro groups, which are subjected to esterification and then subjected to alkaline reduction. In the case when the acid leuco sulfuric acid esters are particularly stable, for example, in the case of the ester of 7:7'-diamino-thioindigo, the sulfaminic acids of the ester salts can also be employed for diazotization, whereby only the sulfuric acid residue attached to the nitrogen is split off. The sulfaminic acids are formed directly during the esterification of the indigoid dyestuffs containing a primary amino group combined with the aromatic nucleus.

The following examples serve to illustrate my invention without limiting it thereto:—

*Example 1.*—10.4 parts by weight of the leuco ester salt possessing the following formula

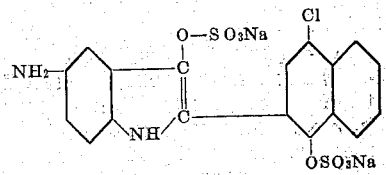

are dissolved in 100 parts of water, 1.4 parts by weight of sodium nitrite are added and 15 parts by weight of 10% hydrochloric acid dropped in slowly at 0° C. with good stirring. An olive green solution is obtained, which is caused to flow immediately into an alkaline solution of 4.5 parts by weight of acetoacetic anilide. The yellow coupling product is precipitated by the addition of common salt and can be purified by dissolving in hot water and salting out. The dyestuff is an olive yellow powder, which dissolves readily in water with a yellow coloration. By adding sodium nitrite to this solution and acidifying with hydrochloric acid an insoluble green dyestuff precipitates.

For the production of the leuco ester salt 5-nitro-isatin-α-chloride is condensed with 1.4-chloronaphthol. The dyestuff thus obtained is esterified in the presence of a tertiary organic base and the nitro group reduced in alkaline solution, for example with sodium hydro sulfite. The sodium salt of the amino ester thus obtained forms an almost colorless powder, which is easily soluble in water.

Example 2.—58 parts by weight of the leuco ester salt of the indigoid dyestuff possessing the following constitution:—

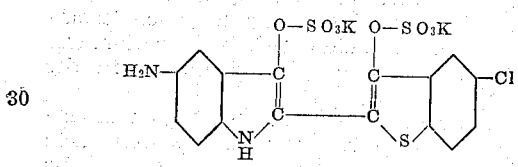

are dissolved in 800 parts of water and mixed with 100 parts by weight of a 30% aqueous acetic acid. A 10% aqueous solution of 6.9 parts by weight of sodium nitrite is then dropped in at 10–15° C. with stirring. The solution becomes then colored olive green and part of the diazo compound of the ester salt crystallizes in small leaflets. The whole is now stirred into an alkaline solution of 20.5 parts by weight of α-anthrol. The dyestuff is salted out and filtered by suction. It dissolves readily in water with a bluish red coloration and dyes wool from an acid bath a deep black violet. By subsequent treatment with acid oxidizing agents the shade is converted to a black. By replacing the α-anthrol by 2:3-hydroxynaphthoic acid a bright red, very readily soluble dyestuff is obtained which changes towards violet in the presence of organic acids. By treatment with mineral acids and an oxidizing agent it is converted into a difficultly soluble blue dyestuff.

For the production of the leuco ester salt 5-nitroisatin-α-chloride is condensed with 5-chlorooxythionaphthene and the reaction product further treated as described in Example 1. The potassium salt of the ester thus obtained forms a yellowish-brown powder which is easily soluble in water.

Example 3.—6 parts by weight of glacial acetic acid are stirred gradually at about 15° C. into a solution consisting of 17 parts by weight of the leuco ester salt of 5-amino-indol-α-anthracene indigo and 2 parts by weight of sodium nitrite in 400 parts of water. The resulting olive colored diazo solution is caused to flow into an alkaline solution of 6 parts by weight of 1-phenyl-3-methyl-5-pyrazolone; a yellow dyestuff is obtained, which is converted into an olive by decomposing with an oxidizing agent.

For the production of the leuco ester salt 5-nitroisatin-α-chloride is condensed with α-anthrol and the reaction product further treated as described in the above examples.

Example 4.—11.7 parts by weight of the leuco ester of 4,7-dimethyl-5-aminoindol-4'-methoxy-naphthalene-indigo possessing the formula:—

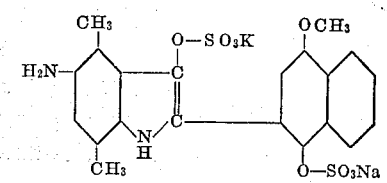

are dissolved in 150 parts of water and converted into the yellow colored diazo solution by treatment with 1.4 parts by weight of sodium nitrite and 20 parts by weight of a 30% aqueous acetic acid. After coupling in the customary manner with 5 parts by weight of acetoacetic acid-o-anisidide the dyestuff produced is isolated by salting out. It dyes the fibre an intense yellow shade. Subsequent treatment with mineral acids and an oxidizing agent produces a green shade.

For the production of the leuco ester salt 4,7-dimethyl-5-nitroisatin-α-chloride is condensed with 1-methoxy-4-naphthol and the reaction product esterified and reduced as described above. 4,7-dimethyl-5-nitroisatin is prepared by nitrating 4,7-dimethylisatin. It melts at 259° C.

Example 5.—6 parts by weight of the leuco ester salt of the dyestuff possessing the formula

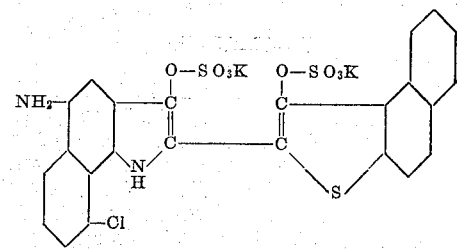

are dissolved in 200 parts of water. After the addition of an aqueous solution of 2.5 parts by weight of oxalic acid 7 parts by weight of a 10% sodium nitrite solution are dropped in with stirring. A reddish brown colored diazo solution is formed, which after coupling with 1-(2'-chloro-)-phenyl-3-methyl-5-pyrazolone produces a readily soluble yellow dyestuff; by oxidation in the presence of acid this is converted to a brownish olive dyestuff.

The starting material of this example is prepared by condensing 4,5-benzo-3-oxythionaphthene with 5-nitro-9-chloro-1,2-naphthisatin and esterifying and reducing the condensation product as described above.

5-nitro-9-chloro-1,2-naphthisatin is obtained by nitrating 9-chloro-1,2-naphthisatin (see German Patent No. 448,946). It crystallizes from glacial acetic acid in red leaflets of melting point 282° C.

Example 6.—From a solution of 25 parts by weight of the leuco ester salt of 5-amino-indol-4'-methoxy-naphthalene-indigo in 800 parts of water a greenish yellow diazo solution is produced in the already described manner by means of 7 parts by weight of sodium nitrite and 80 parts by weight of 50% acetic acid and the diazo solution is coupled with an alkaline solution of 2,3-hydroxy naphthoic acid-o-anisidide. The resulting dyestuff is a readily soluble bluish red, which on oxidation in the presence of acids is converted to a violet grey.

*Example 7.*—6.3 parts by weight of the leuco ester salt of the following constitution:—

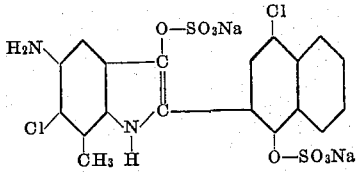

are dissolved into 80 parts by weight of water. Thereupon 10 parts by weight of a 10% aqueous acetic acid are added at a temperature of 0–5° C. and 7 parts by weight of a 10% aqueous sodium nitrite solution are dropped in while stirring. After coupling in alkaline solution with 2.5 parts by weight of acetoacetic-o-chloroanilide the dyestuff is obtained soluble in water with a yellow coloration. After treating with an acid oxidizing agent a green dyestuff is obtained.

The starting material is obtained by condensation of 5-nitro-6-chloro-7-methylisatine chloride with 1,4-chloro-naphthol, converting the dyestuff into its leuco acid salt and reduction of the nitro group. The isatine applied is obtainable by nitration of 6-chloro-7-methylisatine in sulfuric acid. It crystallizes from glacial acetic acid in brownish colored prisms, which melt at 230° C.

*Example 8.*—65 parts by weight of the leuco ester salt of the following constitution:—

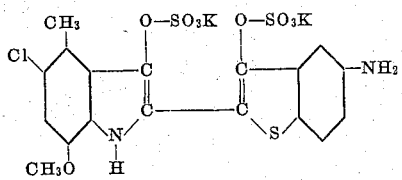

are dissolved together with 7 parts by weight of sodium nitrite into 600 parts by weight of water. To this solution 100 parts by weight of a 30% aqueous acetic acid are dropped in while stirring at a temperature of 0–5° C. The olive colored diazo solution is poured into a soda alkaline solution of 24 parts by weight of acetoacetic-o-anisidide while carefully stirring. The dyestuff, obtainable by salting out, is easily soluble in water with a strong yellow coloration. It dyes wool and cotton yellow shades. On aftertreatment with an acid oxidizing agent these dyeings become yellow—

The 5-nitro-oxythionaphthene used as starting material is obtainable from the 5-nitro-2-chloro-1-benzene carboxylic acid. It crystallizes from alcohol in almost colorless leaflets, melting at 128° C. Instead of the 4-methyl-5-chloro-7-methoxyisatine various other isatines can be applied.

I claim:—

1. The process which comprises diazotizing an acid leuco sulfuric acid ester of an indigoid vat dyestuff containing at least one diazotizable amino group and coupling with a compound of the group consisting of acetoacetic acid arylides and pyrazolones.

2. Process as claimed in claim 1 in which the diazotization is performed in acetic acid solution.

3. Process as claimed in claim 1, in which neither the diazotization component nor the coupling component contain carboxylic or sulfonic acid groups other than those of the leuco sulfuric acid ester groups.

4. The process which comprises diazotizing an acid leuco sulfuric acid ester of an indigoid dyestuff of the group consisting of indolnaphthalene-, indolanthracene- and indolthionaphthene indigos containing at least one diazotizable amino group and coupling with a coupling component suitable for producing azo dyestuffs.

5. The process which comprises diazotizing an acid leuco sulfuric acid ester of an indigoid dyestuff of the group consisting of indolnaphthalene-, indolanthracene- and indolthionaphthalene indigos containing at least one diazotizable amino group and coupling with a compound of the group consisting of acetoacetic acid arylides and pyrazolones.

6. Process as claimed in claim 5 in which the diazotization is performed in acetic acid solution.

7. As new products azo dyestuffs of the general formula R—N=N—R₁ wherein R stands for the radical of an acid leuco sulfuric acid ester of an indigoid vat dyestuff, the azo group being attached to a carbon atom of an aromatic nucleus of said indigoid dyestuff and R₁ stands for the radical of a compound of the group consisting of acetoacetic acid arylides and pyrazolones, being generally water soluble various colored powders, the sulfuric acid ester groups being split off by the action of oxidizing agents in the presence of mineral acid whereby the color is changed.

8. As new products azo dyestuffs of the general formula R—N=N—R₁ wherein R stands for the radical of an acid leuco sulfuric acid ester of an indigoid vat dyestuff of the group consisting of indolnaphthalene—, indolanthracene— and indolthionaphthene indigos, the azo group being attached to a carbon atom of an aromatic nucleus of said indigoid dyestuff and R₁ stands for the radical of a compound of the group consisting of acetoacetic acid arylides and pyrazolones, being generally water soluble yellowish powders, the sulfuric acid ester groups being split off by the action of oxidizing agents in the presence of mineral acid whereby the color is changed to green.

JOSEF HALLER.